United States Patent
Müller et al.

(10) Patent No.: US 7,616,204 B2
(45) Date of Patent: Nov. 10, 2009

(54) METHOD OF SIMULATING DYNAMIC OBJECTS USING POSITION BASED DYNAMICS

(75) Inventors: Matthias Müller, Maennedorf (CH); Bruno Heidelberger, Zurich (CH); Marcus Hennix, Zurich (CH)

(73) Assignee: NVIDIA Corporation, Santa Clara, CA (US)

( * ) Notice: Subject to any disclaimer, the term of this patent is extended or adjusted under 35 U.S.C. 154(b) by 525 days.

(21) Appl. No.: 11/368,407

(22) Filed: Mar. 7, 2006

(65) Prior Publication Data
US 2007/0085851 A1    Apr. 19, 2007

Related U.S. Application Data

(60) Provisional application No. 60/727,857, filed on Oct. 19, 2005.

(51) Int. Cl.
*G06T 15/70*    (2006.01)
(52) U.S. Cl. ............... 345/474; 345/419; 345/420; 345/423; 345/428; 345/581; 382/215
(58) Field of Classification Search ............ 345/473, 345/474, 419, 420, 423, 428, 581; 382/215
See application file for complete search history.

(56) References Cited

U.S. PATENT DOCUMENTS

2006/0235659 A1* 10/2006 Stam ............................ 703/2
2006/0262113 A1* 11/2006 Leprevost ................. 345/419

OTHER PUBLICATIONS

Teran et al. "Robust Quasistatic Finite Elements and Flesh Simulation", ACM Jul. 2005.*
Bridson et al. "Robust Treatment of Collisions, Contact and Friction for Cloth Animation", ACM 2002.*
Baraff et al. "Large Steps in Cloth Simulation", Siggraph 1998.*
Thomas Jakobsen, Advanced Character Physics, Gamasutra, Jan. 21, 2003, URL: http://www.gamasutra.com/resource_guide/20030121/jacobson_01.shtml.

* cited by examiner

*Primary Examiner*—Kimbinh T Nguyen
(74) *Attorney, Agent, or Firm*—Patterson & Sheridan, LLP

(57) ABSTRACT

Disclosed is a method of simulating a dynamic object comprising a plurality of vertices. The method comprises defining a current position and a current velocity for a vertex "v" among the plurality of vertices, generating an estimated next position for vertex "v" based on the current position and current velocity, updating the estimated next position based on a plurality of constraints, and after updating the estimated next position, computing a next position and a next velocity for vertex "v" based on the current position and estimated next position.

20 Claims, 6 Drawing Sheets

METHOD OF SIMULATING DYNAMIC OBJECTS USING POSITION BASED DYNAMICS

This application claims the benefit of U.S. Provisional Application No. 60/727,857 filed on Oct. 19, 2005.

BACKGROUND OF THE INVENTION

1. Field of the Invention

Embodiments of the present invention relate generally to methods of simulating dynamic objects. More particularly, embodiments of the present invention relate to methods of simulating dynamic objects using position based dynamics.

2. Description of Related Art

Contemporary video games tend to incorporate a variety of sophisticated effects designed to mimic the behavior of objects in the real world. These effects include, for example, simulated collisions, explosions, object deformations, and so on. One recent approach that game developers have used to generate these effects is to simulate the movement and interaction of objects using the laws of physics. For example, a video game may model objects such as fluids, clothing, people, and so on, as collections of vertices that are animated by applying forces such as gravity, pressure, friction, viscosity, surface tension, mass-spring forces, and impact, to each vertex. Computational simulations that rely on the laws of physics are referred to in this written description as "physics simulations."

A virtual object that is susceptible to animation (e.g., movement or deformation) in a physics simulation is referred to in this written description as a "dynamic object." A dynamic object is typically modeled as a collection of vertices, each having a position, a mass, and a velocity. In a physics simulation, the positions and velocities of the vertices are updated over time to simulate motion. In some cases, such as a clothing simulation, the vertices may be connected together, i.e. constrained by topological. In other cases, such as fluid simulations, each vertex may be unconnected from the other vertices.

A conventional method of performing a physics simulation on a dynamic object is shown, for example, in Figure (FIG.) 1. In this written description, exemplary method steps are denoted by parentheses (XXX). Referring to FIG. 1, the method comprises accumulating a plurality of forces at each vertex of a dynamic object (101). The method further comprises computing an acceleration for each vertex based the vertex's mass and the accumulated forces on the vertex (102). The acceleration is generally computed by Newton's second law of motion, which states that acceleration equals force divided by mass. The vertex's acceleration is then used to update the vertex's velocity (103), and finally, the vertex's new velocity is used to update its position (104). In general, steps (101) through (104) are carried out at predetermined timesteps throughout the simulation. As such, changes in a vertex's velocity and position are generally calculated by respectively integrating the vertex's acceleration and velocity over each timestep.

The method of FIG. 1 can use a variety of different numerical techniques to update the velocities and positions. For example, some common techniques include various forms of implicit or explicit integration, and finite element method or finite difference approaches.

One variation of the method illustrated in FIG. 1 uses impulses rather than forces to control vertex animation in the physics simulation. Because impulses directly impact velocities, using impulses allows velocities to be updated without performing an integration step on the accelerations. In other words, the impulses can be used instead of performing steps (101) and (102).

In designing and implementing physics simulations for video games, it is important to strike a balance between making the animations look as realistic as possible, and generating the animations fast enough to satisfy any real-time computational constraints of the games. For example, a physics simulation for an interactive video game must be fast enough and realistic enough that a user can engage in meaningful interactions the game's virtual environment without awkward delays or strange visual effects such as interpenetrating or unusually expanding or contracting objects.

In practice, it can be difficult to simultaneously achieve both the speed and realism required by physics simulations in interactive video games. For example, some techniques used to generate highly accurate physics simulations (e.g., techniques used in precision scientific applications such as molecular modeling or protein folding) are too slow for interactive video games. On the other hand, some techniques used to generate fast physics simulations rely on unstable explicit integration techniques that can lead to overshooting and energy gain problems.

As an alternative to conventional methods that use forces or impulses to update the vertex positions of dynamic objects, researchers have developed position based approaches based on position based dynamics. In position based approaches, vertex positions are directly manipulated instead of being updated by integration over a predetermined timestep. Typically, the velocity of each vertex is implicitly stored by current and previous (or current and next) positions of the vertex. Two conventional examples of how the vertex positions may be manipulated include (1) moving each vertex toward a predefined goal position defined by a rest state of the dynamic object, or (2) moving each vertex to a position that satisfies a predetermined positional constraint of the vertex.

One advantage of position based approaches to dynamic object simulation is that they allow increased control over explicit integration, which prevents vertex positions from being adversely affected by numerical instability of the integration. In addition, since the vertex positions are directly manipulated, the vertices can be easily attached to kinematic objects and they can be prevented from penetrating other objects. Finally, position based approaches tend to be easy to understand, to implement, and debug.

SUMMARY OF THE INVENTION

Recognizing the many advantages of position based approaches over conventional force or impulse based approaches to dynamic object simulation, embodiments of the present invention provide several position based techniques capable of manipulating the positions of vertices in a dynamic object based on a general set of constraints. Selected embodiments of the invention also address the problem of conserving linear and angular momentum in the dynamic objects by position projection. Further, in some embodiments of the invention, vertex velocities are represented explicitly to simplify the simulation of damping and friction.

According to one embodiment of the invention, a method of simulating a dynamic object comprising a plurality of vertices, is provided. The method comprises defining a current position and a current velocity for a vertex "v" among the plurality of vertices, generating an estimated next position for vertex "v" based on the current position and current velocity, updating the estimated next position based on a plurality of constraints, and after updating the estimated next position, computing a next position and a next velocity for vertex "v" based on the current position and estimated next position.

According to another embodiment of the invention, a method of updating a position of a vertex associated with a dynamic object in a dynamic object simulation is provided. The method comprises projecting the vertex onto a constraint by updating a position of the vertex along a gradient of a constraint function associated with the constraint.

According to still another embodiment of the invention, a method of performing a cloth simulation is provided. The method comprises modeling a piece of cloth as a mesh, wherein nodes of the mesh define locations of vertices of a dynamic object. The method further comprises updating a position of a vertex "v" among the vertices by projecting vertex "v" onto a bending constraint and a stretching constraint using a Gauss-Seidel type iterative procedure.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF EXEMPLARY EMBODIMENTS

Exemplary embodiments of the invention are described below with reference to the corresponding drawings. These embodiments are presented as teaching examples. The actual scope of the invention is defined by the claims that follow.

In general, embodiments of the present invention provide methods of simulating dynamic objects using a position-based approach. The position based-approach allows video game developers to generate realistic-looking animations while achieving the computational efficiency required for real-time interactive video games.

Although several embodiments of the invention are particularly suited to video games, embodiments of the invention can also be adapted for use in other application areas such as computer graphics, scientific modeling, computer generated imagery, and so on.

Embodiments of the invention can be implemented in any of a variety of software configurations, or on any of a variety of computing platforms. For example, a dynamic object simulation can be run as a single application on a general purpose central processing unit (CPU), or as a secondary application running in parallel with a main application. Where the dynamic object simulation is run as a secondary application, the secondary application may run on the same processor as the main application, or on another processor such as a physics processing unit, or another CPU. Several different software and hardware configurations for running a dynamic object simulation according to various embodiments of the present invention are disclosed, for example, in U.S. patent applications Ser. Nos. 10/715,459, 10/815,721, and 10/982,791.

In selected embodiments of the invention, a dynamic object is modeled by a set of vertices, where each vertex is characterized by a position in a three dimensional (3D) virtual space, a velocity, and a mass. The position of each vertex is governed by a corresponding set of constraints such that when the dynamic object is simulated, the position of each vertex is updated in accordance with the constraints. Since a vertex's velocity is related to its change in position, each vertex's velocity is generally updated along with its position.

Figure 1:
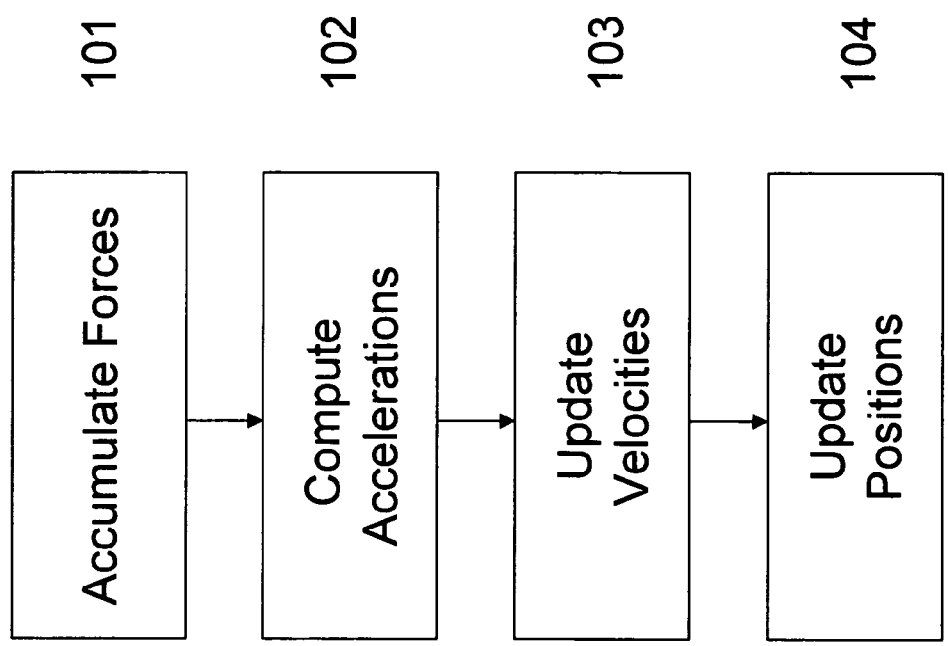
FIG. 1 shows a conventional method of simulating a dynamic object.
Figure 2:
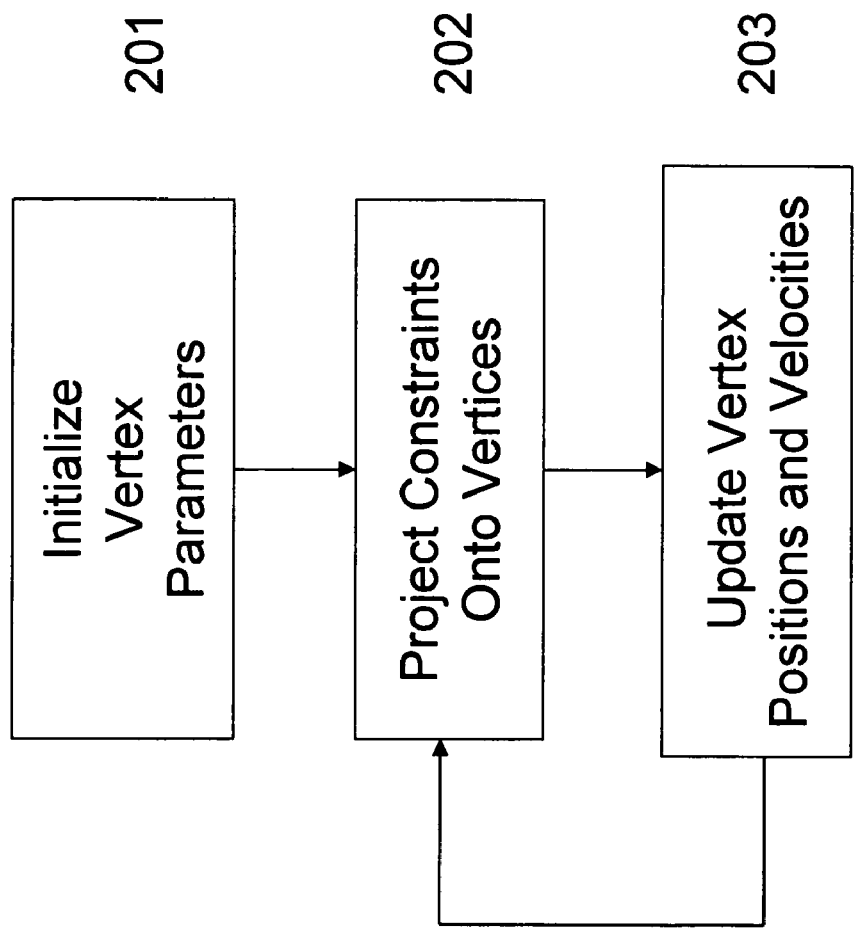
FIG. 2 illustrates a method of simulating a dynamic object according to one embodiment of the present invention.

FIG. 2 shows a simple example of how a dynamic object may be simulated according to one embodiment of the invention. Referring to FIG. 2, a method of simulating a dynamic object comprises initializing a set of vertex parameters corresponding to a set of vertices of the dynamic object (201). The vertex parameters comprise a vertex position, a velocity, and a mass for each of the vertices. The method further comprises projecting the vertices onto the constraints to generate new vertex positions and velocities (202), and then replacing current vertex positions and velocities with the new vertex positions and velocities (203). The simulation then proceeds by repeating steps (202) and (203).

Within the context of a position-based dynamic object simulation, the term "constraint" refers broadly to any set of mathematical, geometrical, or algorithmic relationships used to determine a vertex's position. For instance, a constraint may define a desired distance or distance range between the positions of two vertices within the same dynamic object. Such a constraint is referred to as a "distance constraint." Where the actual distance between the two vertices is the same as the desired distance or is within the desired distance range, the vertices are said to "satisfy" the distance constraint. Similarly, whenever the relationship defined by any type of constraint is true with respect to a particular vertex or vertex position, the vertex or vertex position is considered to "satisfy" the constraint. In step (202) of FIG. 2, the vertices are "projected" onto the constraints by moving the vertices to new positions such that the vertices either satisfy or at least approximate the constraints.

Figure 3:
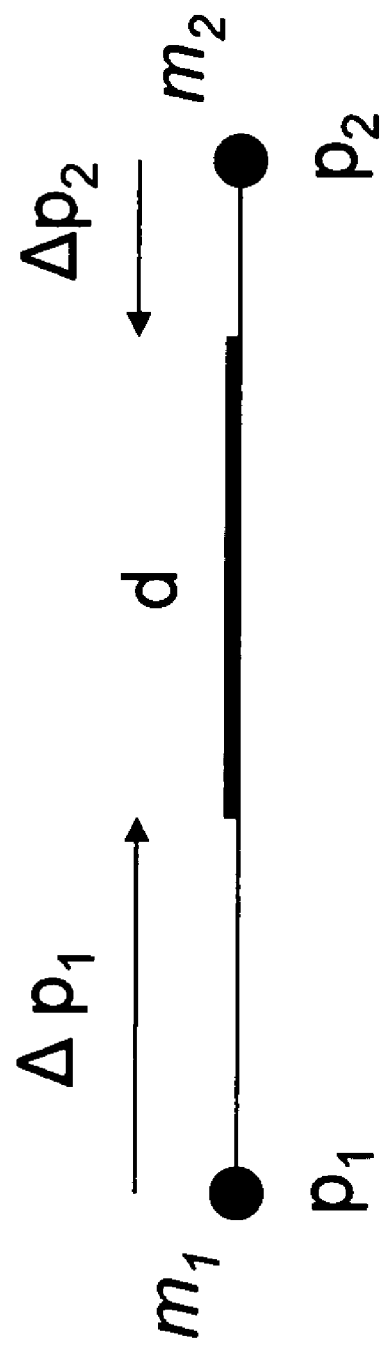
FIG. 3 illustrates a set of two vertices whose positions is governed by a distance constraint.

In equation form, the process of projecting a vertex onto a constraint can be described as follows. Let $C(p)=f(p)$ represent a constraint function for the positions "p" of a set of vertices. The vertices are projected onto a constraint with constraint function "$C(p)$" by determining some position changes "$\Delta p$" such that $C(p+\Delta p)=0$. For instance, FIG. 3 shows a set of two (2) vertices with positions $p_1$ and $p_2$ which are governed by a distance constraint with the following constraint function: $C(p_1, p_2)=|p_1-p_2|-d$, where d is the desired distance between vertices $p_1$ and $p_2$. The distance constraint with constraint function $C(p_1, p_2)$ is satisfied by modifying positions $p_1$ and $p_2$ by $\Delta p_1$ and $\Delta p_2$ such that $C(p_1+\Delta p_1, p_2+\Delta p_2)=0$. A more detailed description of how position changes $\Delta p$ may be calculated is presented later in this written description.

In addition to distance constraints, vertex positions may also be governed by collision constraints, attachment constraints, linear momentum constraints, and angular momentum constraints, to name but a few.

In general, collision constraints define boundaries for a vertex's motion. For example, the collision constraints may define limits at which a vertex will collide with another object or surface in the dynamic object simulation. A vertex is considered to satisfy a particular collision constraint whenever the vertex's position does not extend beyond the boundaries defined by the collision constraint.

An attachment constraint requires a first vertex's position to be linked with a second vertex's position within the simulation. Based on the linking, whenever the position of the first vertex changes, the position of the second vertex also changes, or vice versa. Accordingly, attachment constraints can be used, for example, to bind the motion of one dynamic object to the motion of another dynamic object or a static object in a simulation. A simple way to implement an attachment constraint is to simply set a vertex's position to a static target position, or update the vertex's position at every timestep to coincide with the position to a target position on a kinematic object. To prevent other constraints related to the vertex from influencing the vertex's position, the inverse mass of the vertex can be set to zero.

Linear and angular momentum constraints require that changes in vertex positions due to the internal constraints of a dynamic object conserve linear and angular momentum of the object. The term "internal constraints" here denotes constraints related entirely to components (e.g., vertices) within the dynamic object. For instance, distance constraints are generally considered to be internal constraints since they typically only involve vertices within the same dynamic object. In contrast, collision and attachment constraints are external constraints because they relate to external boundaries and objects.

In general, linear and angular momentum constraints take into account changed positions for all vertices in a dynamic object. For instance, a linear momentum constraint for a dynamic object including several vertices is satisfied when the vertices change positions such that the following relationship (1) is true:

$$\sum_i m_i \Delta p_i = 0. \tag{1}$$

In relationship (1), $m_i$ denotes the mass of the $i^{th}$ vertex of the dynamic object, and $\Delta p_i$ denotes a change in the $i^{th}$ vertex's position. Another way of stating relationship (1) is that the dynamic object's center of mass must stay the same after its vertex positions change in order for the dynamic object's linear momentum constraint to be satisfied. Similarly, the angular momentum constraint for the dynamic object is satisfied when the vertices change positions such that the following relationship (2) is true:

$$\sum_i r_i \times m_i \Delta p_i = 0. \tag{2}$$

In relationship (2), $r_i$ denotes a distance from the $i^{th}$ vertex to an arbitrary center of rotation for the dynamic object.

Whenever the changes in vertex positions due to internal constraints fail to satisfy the linear and/or angular momentum constraints, the dynamic object will behave as though acted on by "ghost" external forces. These "ghost" external forces will cause the object's center of mass to change and/or its vertices to rotate about the center of rotation.

Throughout a dynamic object simulation, most of the constraints governing a dynamic object's vertex positions tend to stay the same. For instance, distance constraints generally do not change. However, an object's collision constraints generally vary based on the object's movement, and based on the movement of other objects in its environment.

Figure 4:
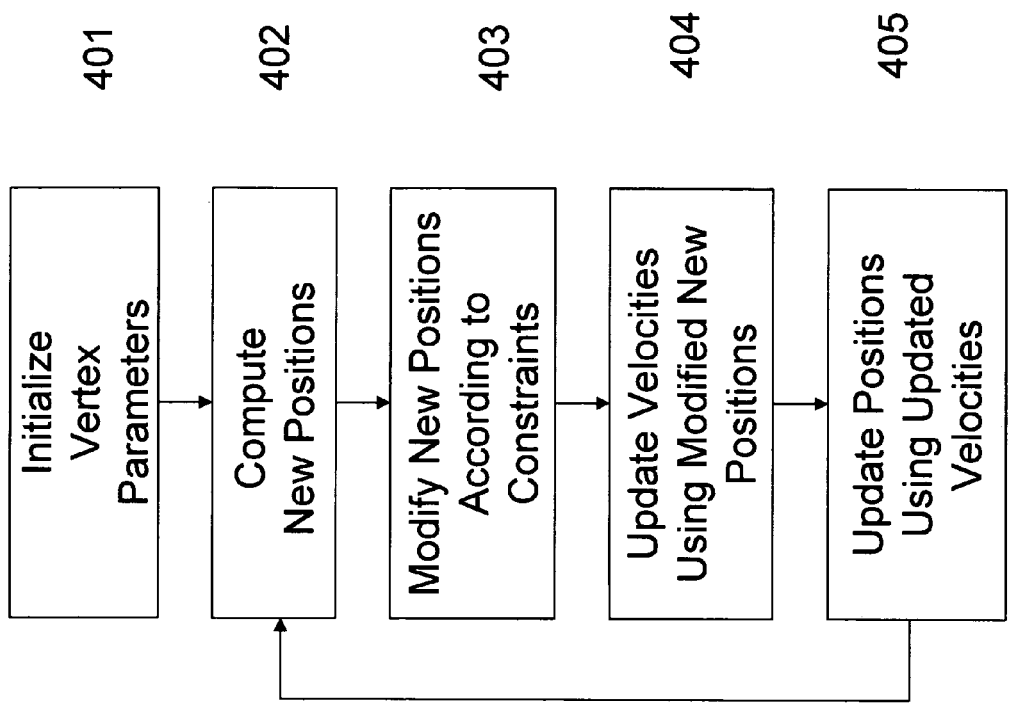
FIG. 4 illustrates a method of simulating a dynamic object according to another embodiment of the present invention.

According to selected embodiments of the invention, new positions for the vertices of a deformable object can be generated by first predicting the new positions and then using the constraints to modify the predicted new positions. FIG. 4 illustrates a method of simulating a dynamic object wherein predicted vertex positions are used to generate new vertex positions.

Referring to FIG. 4, the method comprises initializing a set of vertex parameters for a deformable object (401). The vertex parameters include a position, mass, and velocity for each vertex associated with the deformable object. The method further comprises computing new positions for the vertices based on their respective current velocities (402). The new positions are then modified based on constraints associated with the vertices (403). Next, the vertex velocities are updated with the respective differences between the modified new positions and their corresponding current vertex positions, divided by a timestep (404). Finally, the vertex positions are updated with the respective modified new position estimates (405).

The following exemplary simulation algorithm illustrates one way of implementing the method illustrated in FIG. 4. In the simulation algorithm, a dynamic object is represented by a set of "N" vertices and "M" positional constraints. In addition, the object's motion is also governed by $M_{coll}$ collision constraints. Among the vertices, each vertex $i \in [1, \ldots, N]$ has a mass $m_i$, a position $x_i$, and a velocity $v_i$. Among the constraints, each constraint $j \in [1, \ldots, M]$ includes a cardinality $n_j$, a function $C_j: R^{3n_j} \to R$, a set of indices $\{i_j, \ldots i_{n_j}\}$, $i_k \in [1, \ldots N]$, a stiffness parameter $k_j \in [0 \ldots 1]$, and a type of either "inequality" or "equality". A constraint j with type "equality" is satisfied if $C_j(x_{i_j}, \ldots, x_{i_{n_j}}) = 0$, and a constraint j with type "inequality" is satisfied if $C_j(x_{i_j}, \ldots, x_{i_{n_j}}) \geq 0$. The stiffness parameter $k_j$ defines the strength of the constraint in a range from zero to one. The simulation algorithm is defined as follows:

```
(1)   for all vertices i
(2)       initialize x_i=x_i^0,v_i=v_i^0,w_i=1/m_i
(3)   endfor
(4)   loop
(5)       forall vertices i do v_i ← v_i+Δtw_i f_ext(x_i)
(6)       damp velocities (v_1, ... ,v_N)
(7)       forall vertices i do p_i ← x_i+Δtv_i
(8)       forall vertices i do generateCollisionConstraints (x_i → p_i)
(9)       loop solverIterations times
(10)          projectConstraints (C_1, ... ,C_{M+M_coll}, p_1,...p_2)
(11)      endloop
(12)      forall vertices i
(13)          v_i ← (p_i-x_i)/Δt
(14)          x_i ← p_i
(15)      endfor
(16)      velocityUpdate (v_1, ... , v_N)
(17)  endloop
```

In the simulation algorithm, lines (1)-(3), (7), (9)-(11), and (12)-(15) correspond to respective steps (401), (402), (403), and (404)-(405) in FIG. 4. Lines (1)-(3) initialize the positions, velocities, and masses of the vertices. Line (5) computes an estimated velocity for each vertex based on the vertex's current velocity and any external forces acting on the dynamic object at the vertex's position. Line (7) computes an new position "$p_i$" for each vertex "i" in the dynamic object based on the vertex's current position $x_i$ and velocity estimate. Lines (9)-(11) modify new positions "p" by projecting the constraints onto the new positions, and then lines (12)-(15) update vertex positions $x_i$ and velocities $v_i$ based on the modified new positions.

In lines (5) and (7), velocity estimates and new position estimates $p_i$ are computed using an explicit Euler integration step with a timestep $\Delta t$. Line (5) takes external forces $f_{ext}(x_i)$ that cannot be converted into positional constraints and uses them to compute the velocity estimates. For example, line (5) generally includes gravity as an external force, so that line (5) becomes $v_i \leftarrow v_i + \Delta t g$, where "g" stands for acceleration due to gravity.

Of the remaining lines in the simulation algorithm, line (6) executes a velocity damping operation on the estimated velocities, line (8) generates the $M_{coll}$ collision constraints, and line (16) uses friction and restitution coefficients to modify the velocities of any vertices affected by collisions.

Lines (9)-(11) use an iterative process to modify new positions "p" so that they satisfy the "M" positional constraints and the "$M_{coll}$" collision constraints. One way to implement the iterative process is with Gauss-Seidel-type iteration. The Gauss-Seidel type iteration loops through the M+$M_{coll}$ constraints, and with each loop, it projects each vertex of the dynamic object onto a new location satisfying a single one of the constraints. In the Gauss-Seidel type iteration, the new vertex locations immediately become available to the iterative process, thus speeding up convergence.

The new positions produced by the iterative process and applied to the dynamic object in lines (13) and (14) will never cause the vertices of the dynamic object to overshoot their equilibrium positions, and hence the simulation method defined by the algorithm is unconditionally stable.

In the iterative process, the vertices are projected onto the constraints in such a way that the linear and angular momentum of the dynamic object are conserved with respect to the internal constraints. An illustration of how this can be done follows.

Suppose we have a constraint "C" on positions $p_1, \ldots, p_n$ with a cardinality n and stiffness k. We let p be the concatenation $[p_1^T, \ldots p_n^T]^T$. Where C is an internal constraint, it is independent of the rigid body modes of the dynamic object, i.e., translation and rotation. This means that rotating or translating the dynamic object does not change the function value of the constraint for each vertex. The gradient $\nabla_p C$ is perpendicular to the rigid body modes because it is the direction of maximal change. If the position changes $\Delta p$ are chosen to be along $\nabla_p C$, linear and angular momenta are automatically conserved if all vertices have the same mass. We can derive a method for computing the position changes $\Delta p$ when all vertices have the same mass as follows.

We want to find position changes $\Delta p$ such that $C(p+\Delta p)=0$. This equation can be approximated by the following equation (3):

$$C(p+\Delta p) \approx C(p) + \nabla_p C(p) \cdot \Delta p = 0 \qquad (3)$$

If $\Delta p$ is restricted to be in the direction of $\nabla_p C$, then there is some scalar $\lambda$ such that the following equation (4) is true:

$$\Delta p = \lambda \nabla_p C(p). \qquad (4)$$

By substituting equation (4) into equation (3), solving for $\lambda$, and then substituting the value for $\lambda$ into equation (4), the following equation (5) can be derived for $\Delta p$:

$$\Delta p = -\frac{C(p)}{|\nabla_p C(p)|^2} \nabla_p C(p). \qquad (5)$$

Equation (5) defines a regular Newton-Raphson step for the iterative solution of a non-linear equation.

Based on the foregoing, the position change $\Delta p_i$ for an individual point $p_i$ can be computed by the following equation (6):

$$\Delta p_i = -s \nabla_{p_i} C(p_1, \ldots, p_n) \qquad (6)$$

where the same scaling factor "s" is defined for all vertices by the following equation (7):

$$s = \frac{C(p_1, \ldots, p_n)}{\sum_j |\nabla_{p_j} C(p_1, \ldots, p_n)|^2}. \qquad (7)$$

Where each of the i vertices in the dynamic object has a different mass $m_i$, the position change $\Delta p_i$ of each vertex "i" is weighted proportional to their inverse masses as in the following equation (8):

$$\Delta p_i = -s \frac{n \cdot w_i}{\sum_j w_j} \nabla_{p_i} C(p_1, \ldots p_n). \qquad (8)$$

As an example of how the position changes can be computed, consider the constraint function $C(p_1, p_2)=|p_1-p_2|-d$ illustrated in FIG. 3. The derivatives of the constraint function with respect to positions $p_1$ and $p_2$ are $\nabla_{p1} C(p_1, p_2)=n$ and $\nabla_{p2} C(p_1,p_2)=-n$, respectively, with $$n = \frac{p_1 - p_2}{|p_1 - p_2|}.$$

Scaling factor "s" is therefore $$s = \frac{|p_1 - p_2| - d}{1 + 1}$$

and thus position changes $\Delta p_1$ and $\Delta p_2$ are computed according to the following equations (9) and (10):

$$\Delta p_1 = -\frac{w_1}{w_1 + w_2}(|p_1 - p_2| - d)\frac{p_1 - p_2}{|p_1 - p_2|} \qquad (9)$$

$$\Delta p_1 = -\frac{w_2}{w_1 + w_2}(|p_1 - p_2| - d)\frac{p_1 - p_2}{|p_1 - p_2|}. \qquad (10)$$

Since constraints of the type "inequality" are satisfied as long as the constraint function $C(p_1, \ldots, p_n) \geq 0$, vertices are only projected onto an inequality constraint during the iterative process if the constraint's constraint function $C(p_1, \ldots, p_n)<0$. In contrast, constraints of the type "equality" are only satisfied when the constraint function $C(p_1, \ldots, p_n)=0$ and therefore, vertices tend to always be projected onto the equality constraints.

There are many ways to incorporate stiffness parameter "k" into the dynamic object simulation. One way is to simply multiply each of position changes $\Delta p$ by k. However, if k is incorporated in this way for multiple loops of the iterative process, the difference between $\Delta p$ with and without stiffness parameter "K" will depend non-linearly based on the number of loops that are performed. In equation form, if $n_s$ loops of the iterative process are performed, the difference between $\Delta p$ with and without stiffness parameter "k" will be $\Delta p(1-k)^{n_s}$. In practice, it is desirable to be able to adjust position changes $\Delta p$ according to a linear relationship with stiffness parameter k and independent of the number of loops of the iterative process. One way to form such a linear relationship is by multiplying each position change by k' instead of k, where the value of k' is defined by the following equation: $k'=1-(1-k)^{1/n_s}$. By substituting k' for k, the difference between $\Delta p$ with and without stiffness parameter "K" becomes $\Delta p(1-k')^{n_s}=\Delta p(1-k)$, which is a linear relationship in k.

Line (8) of the simulation algorithm generates collision constraints for the dynamic object simulation. The number of collision constraints that are generated in each timestep varies according to the number of vertices that collide with other objects in the simulation. Colliding vertices are detected by testing each vertex "i" of the dynamic object to see whether a line segment between original position $x_i$ and new position $p_i$ enters another object. If the line segment enters a second object, the algorithm computes an entry point $q_c$ and a surface normal $n_c$ of the second object at entry point $q_c$. Then, the simulation algorithm generates an inequality constraint with constraint function $C(p)=(p-q_c)\cdot n_c$ and stiffness k=1 and the inequality constraint is subsequently used to generate the modified new positions. On the other hand, if the line segment lies entirely inside another object, the collision detection has failed at some point. This problem can be addresses by computing a surface point $q_s$ of the other object that is closest to new position $p_i$, and the surface normal $n_s$ of the other object at surface point $q_s$. The simulation algorithm then generates an inequality constraint with constraint function $C(p)=(p-q_s)\cdot n_s$ and stiffness k=1, and the inequality constraint is subsequently used to generate the modified new positions.

Line (16) of the simulation algorithm handles friction and restitution for the collisions by damping the velocity of each colliding vertex in a direction perpendicular to surface normal $n_c$ or $n_s$ and reflecting the velocity of each colliding vertex in a direction toward surface normal $n_c$ or $n_s$.

Collisions between the dynamic object and other dynamic objects (as opposed to collisions between the dynamic object and static objects) can be handled by inputting N vertices and M constraints corresponding to all of the objects into the simulation algorithm. Then, when any vertex with position $p_0$ in one of the objects passes through the plane of a triangle defined by vertices with respective positions $p_1$, $p_2$, and $p_3$ of another one of the objects, the simulation algorithm generates a constraint with constraint function $C(p_0, p_1, p_2, p_3)=\pm(p_0-p_1)\cdot[(p_2-p_1)\times(p_3-p_1)]$, which keeps the vertex with position $p_0$ on the correct side of the triangle. This constraint function is independent of the rigid body modes of the objects, and therefore it will conserve the objects' linear and angular momentum. Although the plane of a triangle is used to test for collisions in this example, collisions can be defined in relation to other surfaces of simulated objects, including, for example, the plane of an arbitrary polygon or a curved surface.

Line (6) of the simulation algorithm damps the velocities of each of the N vertices. The following damping subroutine illustrates one way to perform the damping:

(1) $x_{cm} = (\Sigma_i x_i m_i)/(\Sigma_i m_i)$
(2) $v_{cm} = (\Sigma_i v_i m_i)/(\Sigma_i m_i)$
(3) $L = \Sigma_i r_i \times (m_i v_i)$
(4) $I = \Sigma_i \tilde{r}_i \tilde{r}_i^T m_i$ -continued (5) $\omega = I^{-1} L$
forall vertices i
(7) $\Delta v_i = v_{cm} + \omega \times r_i - v_i$
(8) $v_i \leftarrow v_i + k_{damping} \Delta v_i$
endfor In the damping subroutine, $r_i = x_i - x_{cm}$, $\tilde{r}_i$ is a 3×3 matrix with the property that $\tilde{r}_i v = r_i \times v$, and $k_{damping} \in [0 \ldots 1]$ is a damping coefficient. Lines (1) through (5) of the damping subroutine compute a global linear velocity $x_{cm}$ and angular velocity $\omega$ for the dynamic object. Lines (6) through (9) of the damping subroutine damp individual deviations $\Delta v_i$ from the global motion $v_{cm} + \omega \times r_i$. Where the damping coefficient is set to $k_{damping}=1$, only the global motion survives and the N vertices behave like a rigid body. For arbitrary values of $k_{damping}$, the velocities are globally dampened but without influencing the global motion of the vertices.

Selected embodiments of the invention can be used to simulate cloth. For example, a piece of cloth can be represented as a triangular mesh wherein each node of the mesh represents a vertex of a simulated dynamic object. The triangular mesh has a density $\rho$ defined in mass per area (e.g., kg/m$^2$), and the mass of each vertex is set to the sum of one third of the area of each adjacent triangle times $\rho$. Although this example uses a triangular mesh, those skilled in the art will understand that various different mesh topologies can be used to perform the cloth simulation.

Each edge of the triangular mesh has a stretching constraint with a constraint function $C_{stretch}(p_1,p_2)=|p_1-p_2|-l_0$, a stretching stiffness $k_{stretch}$, and type "equality." In the stretching constraint, a scalar $l_0$ is an initial length of the edge and stretching stiffness $k_{stretch}$ is a global constraint typically defined by a user and defining a stretching stiffness of the piece of cloth. In addition, each pair of adjacent triangles in the mesh has a bending constraint, which is explained below with reference to FIG. 5.

Figure 5:
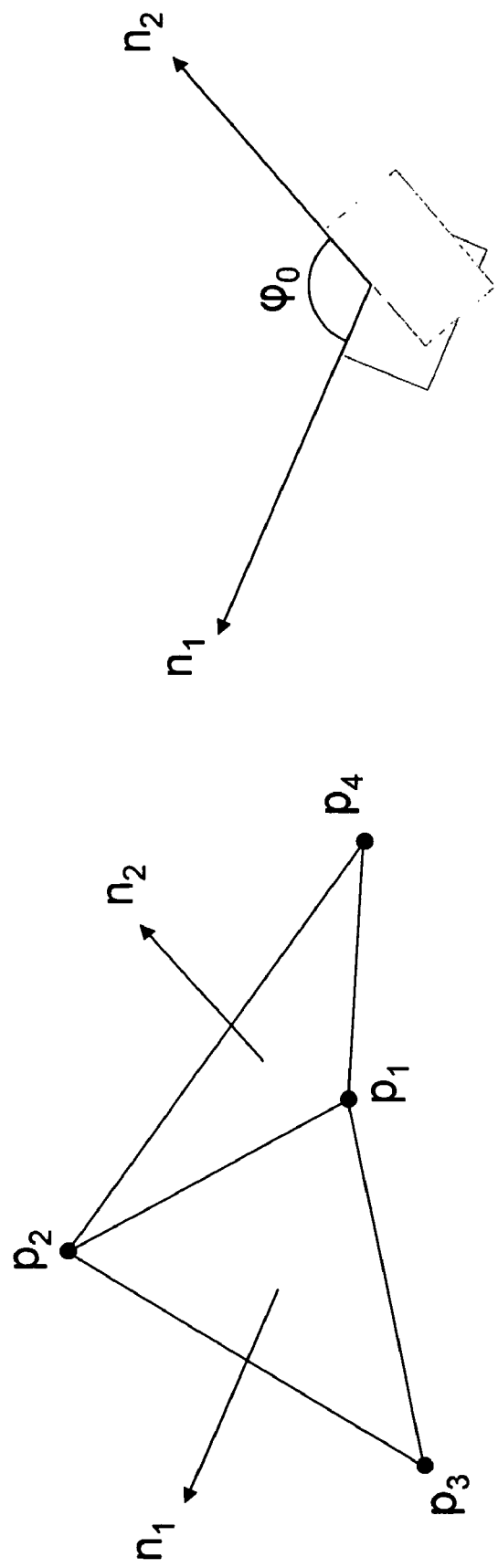
FIG. 5 shows a piece of cloth modeled by a triangular mesh.

FIG. 5 shows a piece of cloth modeled by a triangular mesh including first and second triangles ($p_1$, $p_3$, $p_2$) and ($p_1$, $p_2$, $p_4$), where $p_1$ through $p_4$ are the positions of respective first through fourth vertices of the mesh. First triangle ($p_1$, $p_3$, $p_2$) has a normal $no_1$ and second triangle ($p_1$, $p_2$, $p_4$) has a normal $n_2$, with an initial dihedral angle $\phi_0$ between normals $n_1$ and $n_2$. The initial dihedral angle between normals $n_1$ and $n_2$ is shown on the right side of FIG. 5. A bending function for the first and second triangles is typically defined with a constraint function defined by the following equation (11)

$$C_{bend}(p_1, p_2, p_3, p_4) = ar\cos\left(\frac{(p_2-p_1)\times(p_3-p_1)}{|(p_2-p_1)\times(p_3-p_1)|} \cdot \frac{(p_2-p_1)\times(p_4-p_1)}{|(p_2-p_1)\times(p_4-p_1)|}\right) - \varphi_0, \quad (11)$$

a bending stiffness $k_{bend}$, and type "equality."

Another way to define the bending constraint between the first and second triangles is to specify a distance constraint between the vertices at positions $p_3$ and $p_4$. However, a bending constraint defined in this way is dependent on the stretching of the cloth because the distance between the vertices at positions $p_3$ and $p_4$ depends on the length of the edges incident to these vertices.

Vertices can be projected onto the stretching constraint using equations (9) and (10). On the other hand, vertices are generally projected onto the bending constraints by a slightly more complicated procedure such as the following.

First, position $p_1$ is set to zero so that equation (11) becomes $C_{bend}(p_1, p_2, p_3, p_4) = a r \cos(n_1 \cdot n_2) - \Phi_0$, where normal $n_1$ is defined as $$\frac{p_2 \times p_3}{|p_2 \times p_3|}$$

and normal $n_2$ is defined as $$\frac{p_2 \times p_4}{|p_2 \times p_4|}.$$

The gradient of the constraint function is computed with respect to the positions of the first through fourth vertices as follows:

$$\nabla_{p_3} C = -\frac{1}{\sqrt{1-d^2}} \left( \frac{\partial n_1}{\partial p_3} \cdot n_2 \right), \quad (12)$$

$$\nabla_{p_4} C = -\frac{1}{\sqrt{1-d^2}} \left( \frac{\partial n_2}{\partial p_4} \cdot n_1 \right), \quad (13)$$

$$\nabla_{p_2} C = -\frac{1}{\sqrt{1-d^2}} \left( \frac{\partial n_1}{\partial p_2} \cdot n_2 + n_1 \cdot \frac{\partial n_2}{\partial p_2} \right), \text{ and} \quad (14)$$

$$\nabla_{p_1} C = -\nabla_{p_2} C - \nabla_{p_3} C - \nabla_{p_4} C, \quad (15)$$

wherein, $d = (n1 \text{ dot } n2)$.

Next, using gradients of normalized cross products, the following components of a projection equation are computed:

$$q_3 = \frac{p_2 \times n_2 + (n_1 \times p_2)d}{|p_2 \times p_3|} \quad (16)$$

$$q_4 = \frac{p_2 \times n_1 + (n_2 \times p_2)d}{|p_2 \times p_4|} \quad (17)$$

$$q_2 = \frac{p_3 \times n_2 + (n_1 \times p_3)d}{|p_2 \times p_3|} - \frac{p_4 \times n_1 + (n_2 \times p_4)d}{|p_2 \times p_4|} \quad (18)$$

$$q_1 = -q_2 - q_3 - q_4 \quad (19)$$

Finally, the position changes for the first through fourth vertices can be computed according to the following projection equation (20):

$$\Delta p_i = -\frac{4w_i}{\sum_j w_j} \frac{\sqrt{1-d^2} \, (arcos(d) - \varphi_0)}{\sum_j |q_j|^2}. \quad (20)$$

Collisions between a cloth object and a rigid body can be handled by testing a line segment between each cloth vertex's original and new position for intersection or penetration across a boundary of the rigid body as described above in relation to line (8) of the simulation algorithm. Likewise, cases where the line segment crosses the boundary or lies entirely within the rigid body can be handled as described above. For dynamic interactions between the cloth and the rigid body, an impulse $m_i \Delta p_i / \Delta t$ can be applied to the rigid body at a contact point between a vertex "i" and the rigid body each time vertex "i" collides with the rigid body.

In practice, the triangles defined by the vertices of a simulated piece of cloth may be so large that a rigid body may penetrate the cloth without colliding with any of the cloth's vertices. To address this problem, convex corners of rigid bodies may also be tested for collisions with the cloth triangles.

Figure 6:
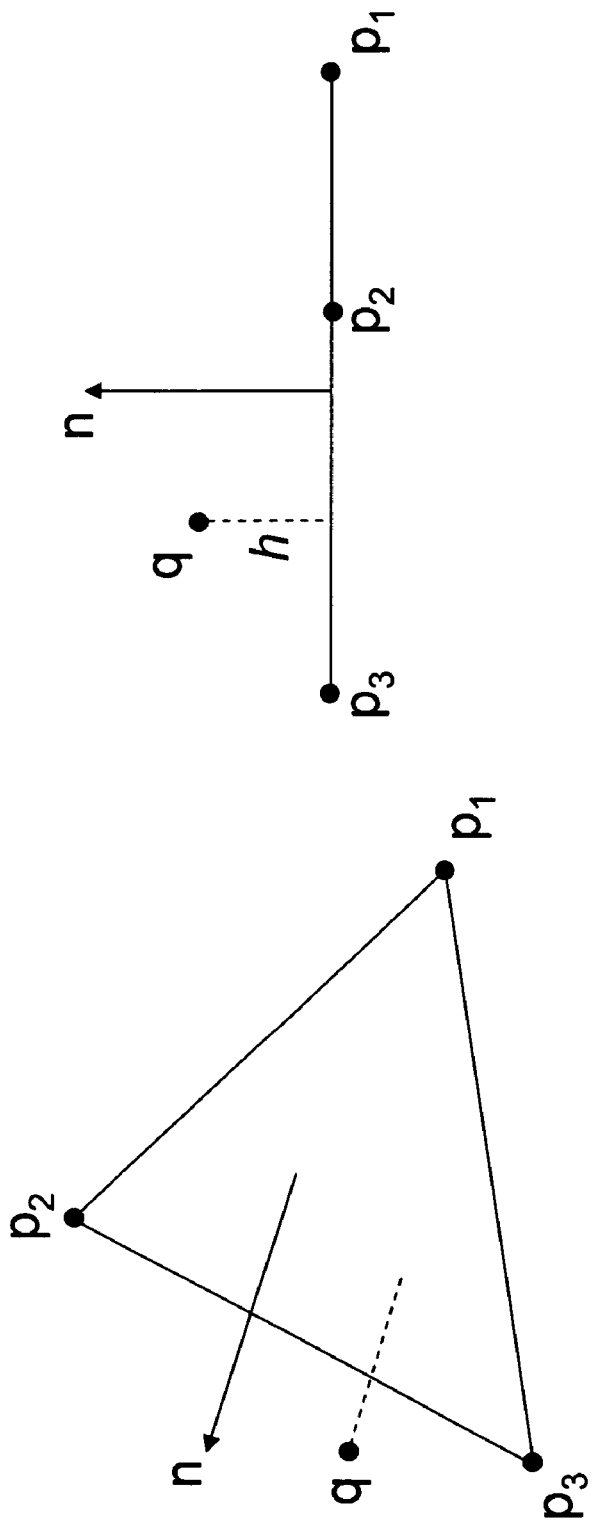
FIG. 6 shows a collision involving a vertex and a simulated piece of cloth.

Another problem to be addressed in a cloth simulation is collisions between different parts of the cloth, also called "self-collision." FIG. 6 illustrates one way of handling self collision in a cloth simulation. In FIG. 6, a triangle defined by vertices at positions $p_1$, $p_2$, and $p_3$ and having a normal n is penetrated by a vertex q. The right side of FIG. 6 shows a side view of vertex q penetrating the triangle. Whenever such a penetration occurs from a direction facing the normal n, the simulation algorithm generates a constraint with the following constraint function:

$$C(q, p_1, p_2, p_3) = (q - p_1) \cdot \frac{(p_2 - p_1) \times (p_3 - p_1)}{|(p_2 - p_1) \times (p_3 - p_1)|} - h, \quad (21)$$

where h is the cloth thickness. Where vertex q enters the triangle from below, i.e., in the same direction as normal n as shown in FIG. 6, the simulation algorithm generates a constraint with the following constraint function:

$$C(q, p_1, p_2, p_3) = (q - p_1) \cdot \frac{(p_3 - p_1) \times (p_2 - p_1)}{|(p_3 - p_1) \times (p_2 - p_1)|} - h. \quad (22)$$

Projecting vertex q onto the constraints associated with constraint functions (21) or (22) tends to keep vertex q on the correct side of the triangle while conserving the cloth's linear and angular momentum.

Where the piece of cloth being simulated comprises a closed triangular mesh, e.g., if the piece of cloth forms a "cloth balloon," pressure inside the mesh can be modeled by generating an equality constraint with the following constraint function:

$$C(p_1, \ldots, p_N) = \left( \sum_{i=1}^{n_{triangles}} \left( p_{t_1^i} \times p_{t_2^i} \right) \cdot p_{t_3^i} \right) - k_{pressure} V_0, \quad (23)$$

and a stiffness $k=1$. In constraint function (23), $t_1^i$, $t_2^i$, and $t_3^i$ are the three indices of the vertices belonging to each triangle "i," and $p_{t_1^i}$, $p_{t_2^i}$ and $p_{t_3^i}$ are the respective positions of those three vertices. $V_0$ represents an original volume of the closed mesh, and $k_{pressure}$ represents a pressure stiffness which determines how much the volume of the closed mesh is allowed to deviate from the original volume. The sum in constrain function (23) computes the actual volume of the closed mesh and compares it with the product of original volume $V_0$ and pressure stiffness $k_0$. Constraint function (23) yields the following gradients, which can be used to compute position changes $\Delta p_i$ according to equation (8):

$$\nabla_{p_i} C = \sum_{j: r_1^j = i} \left( p_{t_2^j} \times p_{t_3^j} \right) + \sum_{j: r_2^j = i} \left( p_{t_3^j} \times p_{t_1^j} \right) + \sum_{j: r_3^j = i} \left( p_{t_1^j} \times p_{t_2^j} \right). \quad (24)$$

The foregoing preferred embodiments are teaching examples. Those of ordinary skill in the art will understand that various changes in form and details may be made to the exemplary embodiments without departing from the scope of the present invention as defined by the following claims.

What is claimed:

1. A computer-implemented method of simulating a dynamic object comprising a plurality of vertices, the method comprising:

defining a current position and a current velocity for a first vertex included in the dynamic object, wherein the dynamic object is modeled within a graphics application executing on a processing unit;

generating an estimated next position for the first vertex based on the current position and the current velocity;

updating the estimated next position based on a plurality of constraints; and computing a next position and a next velocity for the first vertex based on the current position and the updated estimated next position.

2. The method of claim 1, further comprising:

before generating the estimated next position, updating the current velocity in accordance with external forces acting on the dynamic object.

3. The method of claim 1, wherein the plurality of constraints comprise collision constraints, and the method further comprises:

generating the collision constraints before updating the estimated next position; and updating the next velocity based on the collision constraints.

4. The method of claim 3, wherein generating the collision constraints comprises:

determining that a line segment between the current position and the estimated next position intersects a boundary of a simulated object;

determining a location $q_c$ of the intersection and a surface normal $n_c$ of the simulated object at location $q_c$; and defining a collision constraint on a position p of the first vertex with a constraint function C(p) that is a function of p, $n_c$, and $q_c$.

5. The method of claim 3, wherein generating the collision constraints comprises:

determining that a line segment between the current position and the estimated next position lies entirely within a boundary of a simulated object;

determining a location $q_s$ of a point on the boundary closest to the estimated next position and a surface normal $n_s$ of the simulated object at location $q_s$; and defining a collision constraint on a position p of the first vertex with a constraint function C(p) that is a function of p, $n_s$, and $q_s$.

6. The method of claim 4, further comprising:

damping the velocity of the first vertex in a direction perpendicular to surface normal $n_c$; and reflecting the velocity of the first vertex in the direction of surface normal $n_c$.

7. The method of claim 5, further comprising:

damping the velocity of the first vertex in a direction perpendicular to surface normal $n_s$; and reflecting the velocity of the first vertex in the direction of surface normal $n_s$.

8. The method of claim 1, wherein updating the estimated next position based on the plurality of constraints comprises:

projecting the first vertex onto the plurality of constraints using Gauss-Seidel type iteration.

9. The method of claim 1, wherein the plurality of constraints comprise internal and external constraints; and wherein updating the estimated next position based on the plurality of constraints comprises:

projecting the first vertex onto the internal and external constraints such that linear and angular momentum of the dynamic object due to projection onto the internal constraints is conserved.

10. The method of claim 1, wherein updating the estimated next position based on a plurality of constraints comprises:

projecting the first vertex onto a constraint by computing a gradient of a constraint function associated with the constraint, and updating the position of the first vertex along the gradient.

11. The method of claim 2, further comprising the step of damping the updated current velocity.

12. The method of claim 1, wherein the plurality of constraints comprises at least one of a distance constraint, an attachment constraint, a collision constraint, a bending constraint, and a stretching constraint.

13. The method of claim 1, wherein the step of updating the estimated next position comprises updating the estimated next position using a regular Newton-Raphson step.

14. The method of claim 11, wherein the step of damping comprises:

computing a global linear velocity and a global angular velocity for the dynamic object, and reducing deviation between the updated current velocity and the global linear and angular velocities.

15. The method of claim 1, wherein the step of updating the estimated next position comprises projecting the first vertex onto the plurality constraints by determining a first change in position that satisfies the plurality of constraints.

16. A computer-implemented method of performing a simulation of a piece of cloth, the method comprising:

modeling a piece of cloth as a mesh, wherein one or more nodes of the mesh define locations of one or more vertices of a dynamic object, wherein the dynamic object is modeled within a graphics application executing on a processing unit;

defining a current position and a current velocity for a first vertex of the one or more vertices;

generating an estimated next position for the first vertex based on the current position and the current velocity;

updating a position of the first vertex by projecting the first vertex onto a bending constraint and a stretching constraint using a Gauss-Seidel type iterative procedure; and computing a next position and a next velocity for the first vertex based on the current position and the updated estimated next position.

17. The method of claim 16, wherein the mesh is a triangular mesh, the bending constraint determines a dihedral angle between surface normals of adjacent triangles in the triangular mesh, and the stretching constraint determines a distance between adjacent vertices in the triangular mesh.

18. The method of claim 16, further comprising:

detecting a collision between the piece of cloth and a rigid body; and applying an impulse to the rigid body at a contact point between the rigid body and the piece of cloth.

19. The method of claim 16, further comprising:

detecting a collision between a first part of the piece of cloth and a second part of the piece of cloth; and projecting a second vertex in the one or more vertices associated with the first part onto a constraint adapted to prevent the second vertex from penetrating the second part, wherein projecting the second vertex onto the constraint conserves linear and angular momentum of the piece of cloth.

20. The method of claim 16, wherein the mesh is a closed triangular mesh and the method further comprises:

projecting each vertex in the one or more vertices onto a constraint function adapted to maintain the volume of the closed triangular mesh.

\* \* \* \* \*